June 3, 1952  H. W. STUELAND  2,598,944
TRACTOR MOUNTED SWEEP RAKE
Filed April 26, 1948  2 SHEETS—SHEET 1

INVENTOR.
HAROLD M. STUELAND
BY
ATTORNEYS

June 3, 1952 H. W. STUELAND 2,598,944
TRACTOR MOUNTED SWEEP RAKE
Filed April 26, 1948 2 SHEETS—SHEET 2

INVENTOR.
HAROLD M. STUELAND
BY
ATTORNEYS

Patented June 3, 1952

2,598,944

UNITED STATES PATENT OFFICE 2,598,944

TRACTOR MOUNTED SWEEP RAKE

Harold M. Stueland, East Moline, Ill., assignor to Deere & Company, Moline, Ill., a corporation of Illinois Application April 26, 1948, Serial No. 23,196

2 Claims. (Cl. 214—82)

This invention relates to a load-moving machine and more particularly to a tractor-mounted sweep rake. Still more particularly, the invention relates to means for tilting a sweep rake head to retain the load thereon.

One conventional type of tractor mounted sweep rake includes a pair of longitudinally forwardly extending push bars on the forward end of which is tiltably mounted a rake head. The rake head is adapted for movement between two positions, the first of which is an operating position in which the tines of the rake head are adapted to engage hay or other material on the ground, and the second position being one in which the rake head is tilted so that the tractor may be driven to another point at which the hay is unloaded. Such machine cannot be used for stacking hay, in view of the characteristic structure of the push bars. In another type of rake, the push bars are replaced by lifting structure which may be swung vertically with respect to the tractor. The rake head is carried at the forward end of this structure, and, when loaded, may be elevated to various heights. The invention is particularly concerned with a sweep rake of the latter type.

An important object of the invention relates to means for tilting the rake head and then lifting the entire structure to the desired elevation, using a single lifting means that operates in the sequence named. In this respect, it is a feature of the invention to use speed multiplying means in connection with the lifting device that operates to tilt the rake head and then serves as a lifting connection between the lifting means and the lifting structure for elevating the structure and the rake head. Another object of the invention relates to guide or control means, preferably in the form of parallel linkage, for maintaining the position of the rake head during elevation thereof after tilting. A still further object of the invention relates to means for resiliently holding the tines of the rake head in operative position to engage hay or other material on the ground. A further object of the invention is to provide a sweep rake construction that may be readily attached to a load-moving machine of a well known type, so that this machine may be converted from one type of the machine to another.

Figure 1:
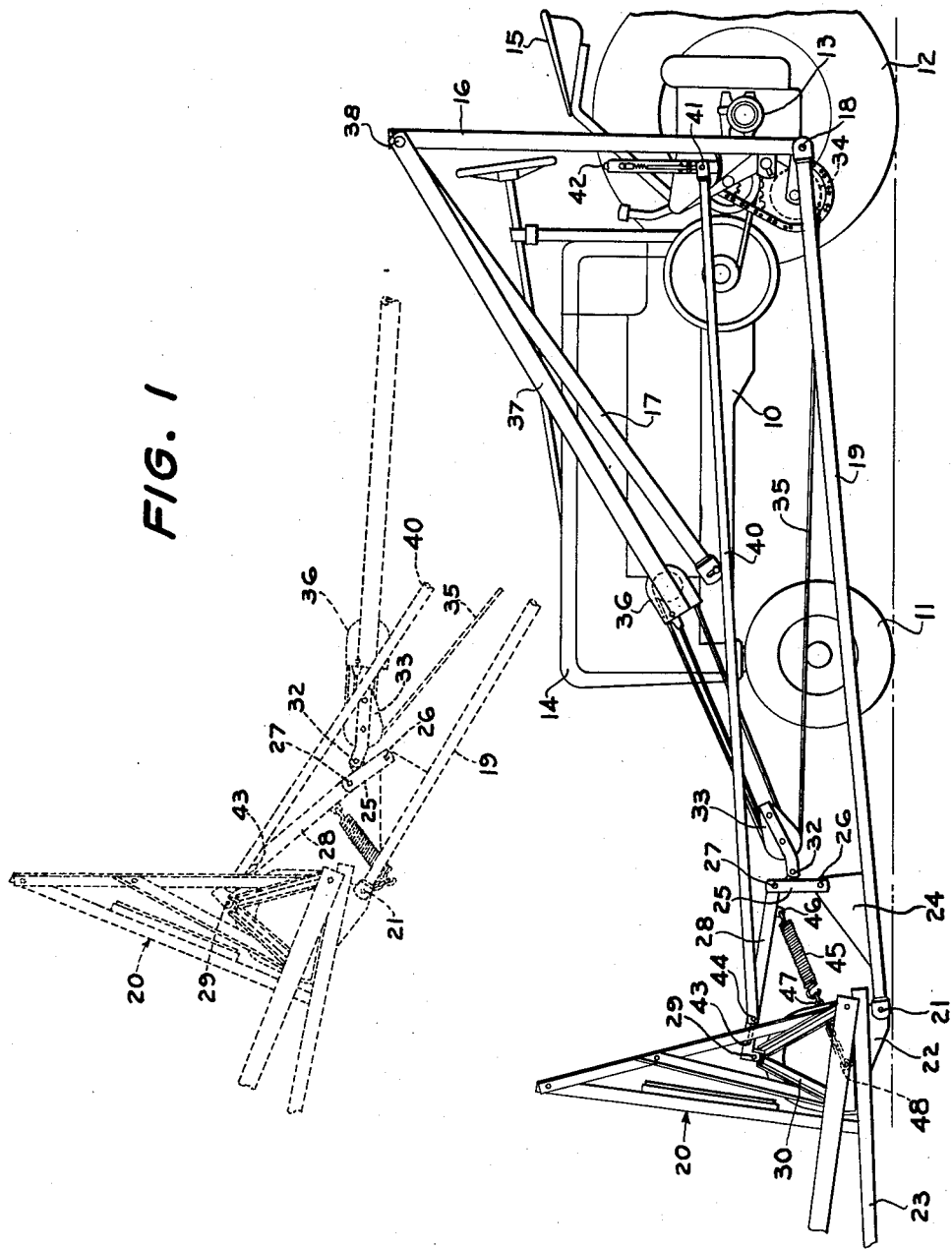
Figure 2:
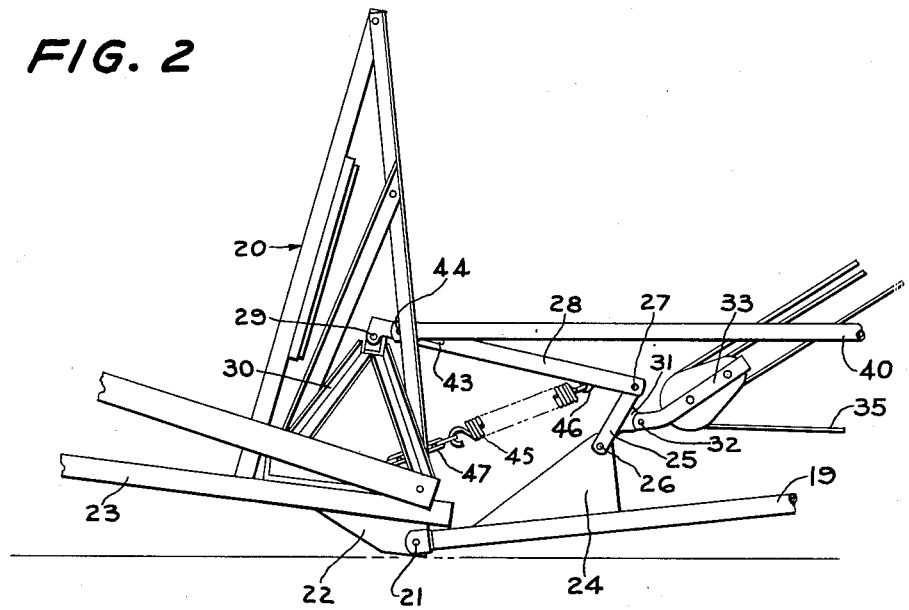
Figure 3:
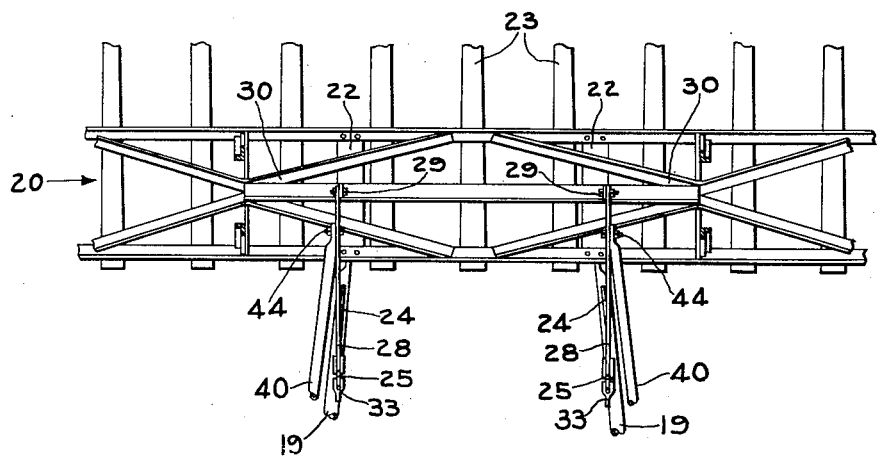

The foregoing and other important objects and desirable features inherent in and encompassed by the invention will become apparent from the following detailed description of a preferred form thereof as illustrated in the accompanying sheets of drawings, in which Figure 1 is a side elevational view showing a tractor mounted rake with the component parts thereof in operating position, as shown in full lines, and also with the operating parts in elevated position, as shown in broken lines;

Figure 2 is a fragmentary side elevational view showing the tilting of the rake head; and Figure 3 is a plan view of the rake head structure showing certain details of its attachment to the lifting structure.

The invention is herein disclosed as applicable to a tractor mounted load-moving machine of the type disclosed in my co-pending application, Serial No. 652,504, filed March 7, 1946, now U. S. Patent No. 2,489,469. Obviously, of course, the fundamental aspects of the invention are otherwise applicable, and the present disclosure should be taken as illustrative and not limiting.

The tractor illustrated is of a well known type comprising a longitudinal body 10 carried on front wheels 11 and rear wheels 12. The rear portion of the body includes a transverse axle structure 13 which carries the traction wheel axles, as is conventional. The forward portion of the body includes the conventional radiator grille and hood structure, as at 14, behind which is located an operator's seat 15. The tractor body 10 comprises the main supporting base or frame for the machine and a further part of the frame comprises upright supporting structure in the form of a mast 16 secured at a lower end portion to the transverse axle structure 13 and appropriately braced by a downwardly and forwardly inclined brace bar 17 which is connected to a forward portion of the tractor body 10. The lower portion of the mast 16 extends below the general level of the axle structure 13 and has pivoted thereto at 18 a pair of longitudinally extending lifting arms 19 (see Figure 3) which comprise a vertically swingable lifting arm structure. A load-carrying member in the form of a rake head 20 is pivoted at 21 to the forward end portions of the lifting members 19 on a transverse horizontal axis, the lower portion of the rake head being provided with a pair of transversely spaced longitudinally running plates 22 for this purpose. The plates 22 include vertical flanges forming shoes or runners on which the rear portion of the rake head 20 rides, and tines or teeth 23 extend forwardly therefrom in the conventional manner.

Each of the lifting members 19 includes at its forward end a rigidly attached upstanding triangular plate 24 which provides supporting means for carrying a lever means 25. The lower portion of the lever means is pivoted at 26 to the apex of the plate 24. The upper end of the lever is pivoted at 27 to the rear end of link means including a forwardly extending link 28. The forward end of the link 28 is pivoted at 29 to bracing structure 30 forming a rigid part of the rake head 20. The linkage means thus provided comprises means for tilting the rake head 20 fore and aft about its pivot axis 21 as the lever 25 is rocked.

The means for rocking the lever 25 to accomplish tilting of the rake head is the same means that ultimately raises the lifting members or arms 19 about the transverse pivots through the points 18. In the particular construction illustrated, the lifting means includes a power operated means including a second arm portion on the lever means 25 provided by a rearwardly extending ear 31 having a pivotal connection at 32 with a sheave block 33. The power operated means further includes a winding drum 34 on which is wound a cable 35. The cable is in turn reeved through the sheave block 33 and through a second sheave block 36 carried at the lower end of a tension member 37, the upper end of which is connected at 38 to the upper end of the mast or upright structure 16. The arrangement is such that winding of the cable 35 on the drum 34 shortens the distance between the points 32 and 38, thus effecting in sequence tilting of the rake head 20 about the pivot 21 and then raising of the entire structure about the transverse beam. The particular lifting means forms no part of the present invention and is illustrated merely as a representation of many types of lifting means that could be employed. The details of the lifting means illustrated form the subject matter of my patent referred to above. The particular type of winding mechanism forms the subject matter of my co-pending application, Serial No. 649,332, filed February 21, 1946, now Patent No. 2,537,557.

In order that the rake head 20 may be adequately controlled in elevated position, I have provided guide or control means comprising a pair of forwardly extending control members or bars 40 having their rear ends proximate to the supporting structure 16 and their forward ends proximate to the rake head 20. The rear end portions of the bars 40 are pivotally connected on a transverse horizontal axis to the supporting structure 16 by pivots 41 (only one of which appears in the drawings) included in a fore and aft adjustable lever 42. For the purposes of the present invention, the function of the lever 42 may be ignored and it may be assumed that the bars 40 are pivoted directly at 41 to the supporting structure 16. The forward ends of the bars are connected to the rake head 20 by means including a lost motion connection comprising a longitudinal slot 43 in the link 28 and a pin 44 in the forward end of the bar 40. When the rake head is in its operation position as shown in full lines in Figure 1, the pin 44 is at the back end of the slot 43. Yieldable means is provided for maintaining the parts in the full line position as shown. This means comprises a tension spring 45 connected to an ear 46 formed integral with the link 28 and to a chain 47 connected to an eye 48 on the rake head 20 ahead of the pivot 21. The spring 45 operates through its connection to keep the tines or teeth 23 of the rake head in ground engaging position; yet the tines are permitted to yield upwardly so that they may follow uneven ground.

The operation of the machine is as follows: The power mechanism that operates the winding drum 34 is so controlled that the cable 35 is allowed to unwind therefrom so that the lifting structure may assume the full line position of Figure 1. The tractor is then driven forwardly, with the machine attached, until the rake head 20 accumulates a load of hay or other material. If it is desired merely to transport the loaded rake head to another point at which the hay will be discharged to the ground, it is necessary to operate the winding drum 34 to an extent sufficient only to tilt the rake head 20 to the position shown in Figure 2, in which case the machine will function like the ordinary sweep rake in which the pusher bars are not vertically movable. However, if it is desired to elevate the load of hay, operation of the winding drum may be continued, thereby further winding the cable 35 until the structure is moved to the dotted line position shown in Figure 1.

Initial tensioning or winding of the cable 35 on the drum 34 applies a rearward force to the lever 25 and consequently applies a rearward force to the tilting link 28, thereby tilting the rake head 20 to the position shown in Figure 2. In this position, the pin 44 at the forward end of the bar 40 will move to the forward end of the slot 43 and engagement between these parts provides a stop for limiting rearward tilting of the rake head. Upon further winding of the cable 35 on the drum 34, the linkage 25—28 serves as a lifting connection between the sheave block 33 and the parts 19—20, whereby the entire structure may be swung upwardly about the point 18 on and with respect to the supporting structure 16. Inasmuch as the linkage 25 and 28 is articulately connected between the lifting arms 19 and rake head 20, and since the bars 40 are compression members, the parts will readily assume the positions shown in dotted lines in Figure 1, the bars 40 serving to control or guide the position of the rake head so that the rake head does not tip rearwardly to an undesirable extent. The linkage 25—28 is thus foldable and extendable, the lever 25 and links 28 being folded in Figure 2 and extended in the dotted line position of Figure 1.

In the movement of these parts from the full line position of Figure 1 to the dotted line position in the same figure, the members 19 and 40 swing upwardly respectively about the pivots 18 and 41. These members are in turn respectively connected to the rake head at the points 21 and 44, the latter connection including the lost motion slot 43. As stated above, initial operation of the lifting means serves to rock the lever 25 rearwardly. The point 38 at the upper end of the mast or supporting structure 16 is considerably higher than either of the points 41 or 18. Therefore, as the members 19 and 40 move upwardly, they do so in upper portions of their quadrants; that is to say, these members move from the horizontal in an approach to the vertical. On the other hand, the other component of the lifting structure, including the sheave blocks 33 and 36, the tension member 37, and that portion of the cable 35 between the sheave blocks, swing upwardly in an arc which is in a lower portion of its quadrant; that is, in a movement from a position below the horizontal to a position which is substantially horizontal. The points 21 and 44 therefore move upwardly and rearwardly. The point 32, except as affected by tensioning of the cable between the sheave blocks 33 and 36, has a tendency to move upwardly and forwardly, thereby allowing the lever 25 and link 28 to assume the dotted line position shown in Figure 1. Without the control member 40, the rake head 20 would be tilted rearwardly to an undesirable extent.

In the particular case illustrated, the linkage and lever means is such that the rake head 20 may be quickly tilted, which is not inconsistent with the load requirement thereon, inasmuch as it requires relatively less power to tilt the rake head 20 then it does to raise the entire lifting structure. It will be observed that the proportions of the linkage could be altered either to increase or decrease the speed at which the rake head is tilted or the force required to tilt it. The construction illustrated has been selected because it is desirable in the circumstances in which used. Likewise, other details of the structure have been similarly selected. It is therefore not desired that the invention be limited to the precise structure illustrated and described, for obviously numerous modifications and alterations may be made in this structure without departing from the spirit and scope of the invention as set forth in the appended claims.

I claim:

1. In a load-moving machine having a frame including front and rear portions, a forwardly extending lifting arm connected at its rear end to the rear portion of the frame for vertical swinging, and a load-carrying member tiltable fore and aft on the front end portion of the lifting member, the improvement comprising: upright supporting structure at the rear portion of the frame; operating linkage connected between the load-carrying member and the lifting arm and including relatively movable parts foldable and extendable to tilt the load-carrying member; lifting means connected between said upright supporting structure and said linkage and contractible along a line of force extending upwardly and rearwardly from said linkage to said upright supporting structure; and operative first to fold said linkage to tilt the load-carrying member rearwardly with respect to the lifting member and then to operate through said linkage to raise the lifting arm, and a longitudinal compression member pivoted at its rear end to the frame above the connection of the lifting member and having means at its forward end connecting it to the load-carrying member above the connection of the latter to the lifting member to provide, with said member, parallel linkage operative to extend the linkage to maintain generally the tilted position of the load-carrying member as the same is raised with the lifting member.

2. In a load-moving machine having a generally longitudinal frame, a longitudinal lifting arm pivoted at its rear end to the frame for vertical swinging of the front end thereof, and a load-carrying member pivoted on said front end of the lifting arm for fore and aft tilting with respect thereto and for vertical swinging therewith, the improvement comprising: a lever pivoted at one end on the lifting arm for fore and aft rocking behind the load-carrying member; link means articulately interconnecting said lever and the load-carrying member so that rearward rocking of the former effects rearward tilting of the latter relative to the lifting arm; lifting means connected between the frame and the lever and operative to rock the latter rearwardly for first tilting the load-carrying member relative to the lifting arm and then acting through the lever to raise the lifting arm and load-carrying member in unison; and a longitudinal compression member pivoted at its rear end on the frame for vertical swinging and having at its front end an articulate connection to the link means, said articulate connection including lost-motion means providing for rearward tilting of the load-carrying member and a stop for limiting such rearward tilting.

HAROLD M. STUELAND.

REFERENCES CITED

The following references are of record in the file of this patent:

UNITED STATES PATENTS

| Number | Name | Date |
|---|---|---|
| 2,116,351 | Jones et al. | May 3, 1938 |
| 2,228,796 | Warren | Jan. 14, 1941 |
| 2,417,560 | McNamara, Jr. | Mar. 18, 1947 |
| 2,440,765 | Acton | May 4, 1948 |
| 2,449,212 | Fraga | Sept. 14, 1948 |
| 2,490,155 | Pfau | Dec. 6, 1949 |